(12) United States Patent
Jain et al.

(10) Patent No.: US 7,558,200 B2
(45) Date of Patent: Jul. 7, 2009

(54) ROUTER CONGESTION MANAGEMENT

(75) Inventors: Kamal Jain, Bellevue, WA (US); Xiaojie Gao, Pasadena, CA (US); Leonard J. Schulman, La Crescenta, CA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 11/035,353

(22) Filed: Sep. 1, 2005

(65) Prior Publication Data

US 2007/0053286 A1 Mar. 8, 2007

(51) Int. Cl.
H04L 12/26 (2006.01)
(52) U.S. Cl. .................................. 370/230; 370/429
(58) Field of Classification Search ............... 370/412, 370/429, 229–240
See application file for complete search history.

(56) References Cited

U.S. PATENT DOCUMENTS

| | | | | |
|---|---|---|---|---|
| 4,769,810 A | * | 9/1988 | Eckberg et al. | 370/232 |
| 4,769,811 A | * | 9/1988 | Eckberg et al. | 370/236 |
| 4,849,968 A | * | 7/1989 | Turner | 370/232 |
| 5,179,556 A | * | 1/1993 | Turner | 370/233 |
| 5,282,203 A | * | 1/1994 | Oouchi | 370/232 |
| 5,315,591 A | * | 5/1994 | Brent et al. | 370/235 |
| 6,167,028 A | * | 12/2000 | Harris | 370/230 |
| RE37,435 E | * | 11/2001 | Yoshimura et al. | 370/236 |
| 6,333,917 B1 | * | 12/2001 | Lyon et al. | 370/236 |
| 6,674,726 B1 | * | 1/2004 | Kado et al. | 370/253 |
| 6,690,645 B1 | * | 2/2004 | Aweya et al. | 370/230 |
| 6,839,321 B1 | * | 1/2005 | Chiruvolu | 370/230.1 |
| 6,970,466 B2 | * | 11/2005 | Okubo | 370/395.1 |
| 7,061,864 B2 | * | 6/2006 | van Everdingen | 370/233 |
| 2002/0027924 A1 | * | 3/2002 | Fukushima et al. | 370/401 |
| 2002/0097695 A1 | * | 7/2002 | Herrmann | 370/329 |
| 2002/0176429 A1 | * | 11/2002 | Calvignac et al. | 370/411 |
| 2003/0058880 A1 | * | 3/2003 | Sarkinen et al. | 370/413 |
| 2006/0092840 A1 | * | 5/2006 | Kwan et al. | 370/230.1 |
| 2006/0187827 A1 | * | 8/2006 | Smith et al. | 370/229 |

OTHER PUBLICATIONS

Stoica, et al. "Core-stateless fair queueing: achieving approximately fair bandwidth allocations in high speed networks", SIGCOMM '98 Vancouver B.C. pp. 118-130.

Garg, Rahul et al. "A Game-Theoretic Approach Towards Congestion Control in Communication Networks", ACM SIGCOMM Computer Communications Review, vol. 32, No. 3, Jul. 2002 pp. 47-61.

Kim et al. "Loss Proportional Decrease Based Congestion Control in the Future Internet" University of Illinois, 1999.

(Continued)

*Primary Examiner*—Kwang B Yao
*Assistant Examiner*—Kenan Cehic
(74) *Attorney, Agent, or Firm*—Lee & Hayes, PLLC (57) ABSTRACT

A concept for providing processes and apparatus for router resource management is described. One process for managing router congestion in a distributed communications system includes monitoring messaging traffic originating from a plurality of clients and determining when one or more of the plurality of clients deviates from an accepted congestion management protocol. The process also includes rank ordering those clients of the plurality according to the egregiousness of their deviation from the protocol to determine a worst offender and dropping packets from the worst offender of the plurality.

10 Claims, 4 Drawing Sheets

OTHER PUBLICATIONS

Williamson et al. "Loss-Load Curves: Support for Rate-Based Congestion Control in High-Speed Datagram Networks" ACM 1991, pp. 17-28.

Bodin et al. "Drop Strategies and Loss-Rate Differentiation", IEEE 2001, pp. 146-154.

Floyd et al. "Promoting the Use of End-to-End Congestion Control in the Internet", IEEE/ACM Transactions on Networking, vol. 7, No. 4, Aug. 1999.

Gao, Xiaojie, et al., "Fair and efficient router congestion control," Computer Science Department, California Institute of Technology, 10 pages.

* cited by examiner

ROUTER CONGESTION MANAGEMENT

This invention was made with government support under Grant No. CCR-0049092 awarded by the National Science Foundation. The government has certain rights in the invention.

TECHNICAL FIELD

This disclosure relates to improvements in router congestion management.

BACKGROUND

Electronically-based communications and intelligence-reproduction technologies have evolved dramatically since the early demonstrations of electronic signaling and allied technologies by Alexander Graham Bell, Thomas Alva Edison, Nikola Tesla, Guglielmo Marconi, Samuel Morse and many other contributors to this area. As these technologies have increased in sophistication, information-carrying capacity, rapidity of communications and other desirable characteristics, the areas of application for such have also increased, promoting efficiency in execution of business and other activities on an extremely broad scale.

With this increased information exchange capability also came increased vulnerability to systemic failures. The nature of electronic data exchange has increased to encompass more types of multimedia data, with concomitant increase in the amount of data being exchanged on a per-message as well as on per-user or per-client bases. As a result, message-handling tasks associated with information flow management have also increased in complexity. Further, the variety of types of data channels, each possessing somewhat unique characteristics and limitations, have increased as other aspects of message exchange have become more complex. In order to be able to maintain communications over long distances, even in the face of severe environmental disturbances, the former Defense Advanced Research Projects Agency developed a messaging tool initially called the "ARPA net" and presently known as the Internet or World Wide Web.

The initial ARPA net data exchange typically was limited to brief textual messaging. This information exchange modality was initially developed to facilitate robust data/information exchange, even in light of severe infrastructural damage, such as might be associated with a natural or man-made disaster. Such disasters tend to result in compounded difficulties because they usually also lead to overloading of the communications infrastructure. The resultant Internet communication mode is presently capable of handling huge amounts of data with great efficiency and is capable of message exchange when other systems are nonfunctional. Additionally, it is more convenient, in many ways, than some other communications tools, at least in part because the recipient has a greater degree of flexibility in choosing when to accept messages and when to respond. This is coupled with a high probability of extremely rapid reception by the intended recipient, even when the recipient is many thousands of miles away from the sender, and is often associated with fixed service price (i.e., no incremental per-message costs), color image as well as motion picture and mixed-media messaging transmission capabilities, providing an attractive ensemble of features for many applications. As a result, protocols were developed that presently provide an efficient, often near-real-time communications exchange medium supportive of a broad gamut of multimedia information.

This communications exchange may take place through a series of multiple different kinds of data transmission systems and may employ multiple data transmission paths over at least portions of an operative communications link. Furthermore, the nature of the transmission system may change during a data exchange or from one data exchange to another, resulting in need for routing and handling sophistication as well as flexibility. The capabilities provided by such varied yet robust types of data exchange have resulted in increasing application of broadband interconnectivity for heretofore unforeseen applications. For example, it is presently possible to rapidly transmit and/or access medical data such as X-rays, soft tissue images and other complex data structures along with textual or other forms of multimedia information to or from remote locations, facilitating potential for rapid and accurate diagnosis. Such finds application, for example, in treatment recommendations for one or more victims of a vehicular disaster, by one or more doctors who are not co-located with the victims and/or the imaging devices and/or one another and who may be in different cities or countries.

As messaging/handling data content increases, impetus is present to promote larger numbers of data packages being shipped—at least in part because range of applicability is facilitated. Conventional email systems for message/data handling tend to break each such data package into standard-size data elements or packets and then transmit each on a "fire and forget" basis. The received elements then must be collated to provide the data package as transmitted. This process may involve more complex strategies than simple serial concatenation of sequentially-transmitted or sequentially-received records. Framing, or inclusion of so-called header information (or a dataset comprising a set of headers) within each packet, facilitates such combination, with the framing or header information acting in a fashion analogous to the traditional "addressed envelope" familiar with respect to written postal communications.

As a result, in many data handling schema, information is included within each packet to facilitate both routing to common destination targets and later recombination of such packets via a series of "handshakes", to provide notice that a portion is missing or to provide appropriate assurance regarding integrity level of post-handling data and/or any resultant delivered datagram. Inclusion of such information relies on a common protocol for determination of, and inclusion of, such information. Typical protocols use standard—but optionally variable-length blocks of data (e.g., 32 kilobytes) with a fixed upper bound for block size, and thus, ultimately, for message size.

Additionally, various media/methodologies and adaptations are employed to communicate/handle data packages or datagrams. Many of these related to email are variations on the hyper text transfer protocol (HTTP) approach or the simple mail transfer protocol (SMTP). However, the present system is known to still present some problems relating to congestion. For example, a long data structure requires more time to be handled than a shorter one, with one potential result being that the data handling system is not available for handling a short data structure while a longer data structure is being handled. This is known as the head-of-line blocking problem. There are thus increasing needs for methods and apparatus for efficiently routing data structures, which may include larger and more complex electronic data packages than in prior decades, via a gamut of types of data transmission paths.

Routers are the backbone of Internet traffic. They analyze packets to route them properly, efficiently and fairly. Fairness becomes a consideration when a router receives more packets per time interval than it can process, and the router is forced to drop some of the packets. Fairness determines which packets should be dropped. One conventional fairness algorithm considers whether each packet source is following a prescribed protocol. For example, sources are supposed to decrease traffic multiplicatively when congestion occurs and increase traffic only additively when congestion abates. The problem with implementing this fairness algorithm is that it is subject to a router's computation bound (i.e., the maximum number of per-packet computational steps a router can perform) and memory access bounds (i.e., maximum per-source packet history the router can maintain). One conventional system that has been developed for addressing this is known by the acronym "CHOKe". That system drops packets from each client in proportion to the volume of packets sourced by that client. This is a simple system and is straightforward to implement, however, empirical observation shows that this may not lead to effective enforcement of the desired protocol. In part, this stems from the "distributed" nature of the "pain" inflicted on all of the clients, when only one of the clients may in fact be guilty of protocol violation.

There are thus needs that have increased over those of prior decades, and that will continue to increase, for efficiently routing data packages of increasing size and complexity.

SUMMARY

In one aspect, the present disclosure describes a process for promoting a fairness-based congestion control protocol and algorithm providing efficiency in router computation and memory demands. In that context, a process for managing router congestion in a distributed communications system includes monitoring messaging traffic originating from a plurality of clients and determining when one or more of the plurality of clients deviates from an accepted congestion management protocol. The process also includes rank ordering those clients of the plurality according to the egregiousness of their deviation from the protocol to determine one or more worst offenders and dropping packets from one or more worst offenders of the plurality.

BRIEF DESCRIPTION

DETAILED DESCRIPTION

Figure 1:
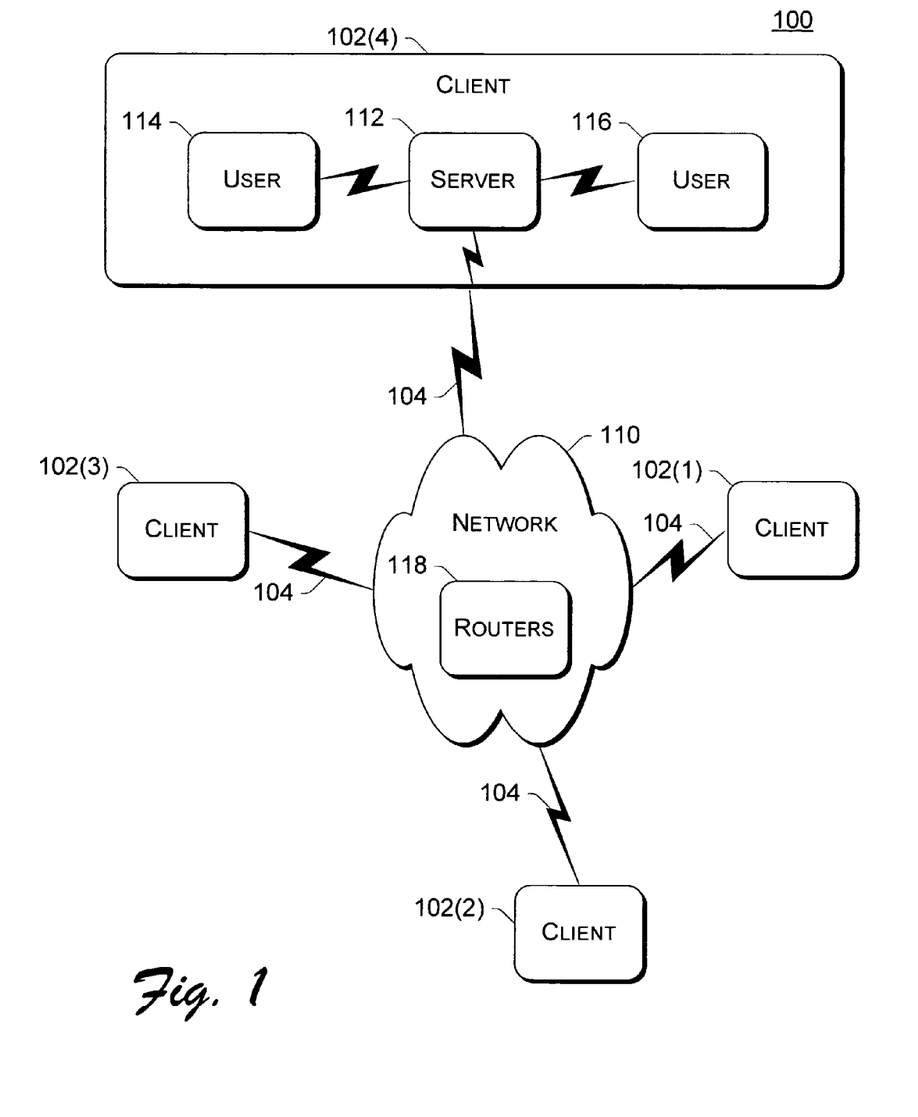
FIG. 1 illustrates an exemplary communications environment suitable for the concepts of the present disclosure.

FIG. 1 illustrates an exemplary environment 100 suitable for implementation of the presently-disclosed concepts. The environment 100 includes N many clients 102, represented in FIG. 1 by four clients, e.g., clients 102(1), 102(2), 102(3) and 102(4), having interconnections 104 to exchange data packets via a network 110, such as the Internet, a LAN, a WAN etc.

Each client 102(N) may include a server, such as server 112 shown in association with client 102(4), coupled to users 114, 116. It will be appreciated that while only four clients 102(N), one server 112 and two users 114, 116 are depicted for simplicity of illustration and ease of understanding, more or fewer of each may be interconnected. The server 112 also performs routing functions.

The network 110 includes a plurality of interconnected routers 118, although only one router 118 is shown in FIG. 1 for simplicity of illustration and ease of understanding. The routers 118 are interconnected such that a redundant or mesh-like group of communications paths exists between any two clients 102(N). Modern routers 118 include multiple processing units and buffers, however, a one-processor, one-queue model is representative of one component of a router 118 and is employed for ease of illustration.

In operation, the network 110 breaks datagrams into packets which are then independently routed via the routers 118 and servers 112 to individual clients 102(N) or users 114, 116. Upon reception, the packets are reassembled to form the message comprising the datagram. The routers 118 operate by queuing the packets, and then sequentially transmitting each packet in conformance with addressing information contained in the packets. When memory or processing resources available within a router 118 are exceeded by the current volume of data packets, each congested router 118 simply discards some of the packets. The remaining packets that are forwarded are acknowledged, and those that are dropped are not acknowledged and thus are retransmitted by the originating client 102(N).

Typically, interconnections 104 may employ TCP/IP for effectuating data and message routing and communication, and may facilitate connection to remote devices (e.g., web sites, other computer systems and the like) using IP (Internet protocol) addresses, URIs (universal resource identifiers) and/or URLs (universal resource locators).

Clients 102(N) may send and receive data and commands using transfer protocols, such as, for example, file transfer protocols (FTP), hyper text transfer protocol (HTTP) or any other protocols known in the art. For example, an HTTP transport can be used to implement SOAP via HTTP and may be used to implement one-way asynchronous communication or two-way synchronous communication. The present disclosure describes messaging in the context of TCP/IP, which can respond to congestion by decreasing packet transmission rates, as is described below in more detail. However, increasingly, traffic on the Internet employs UDP for carrying voice and video signals, and which does not respond to congestion by decreasing packet transmission rate.

When the routers 118 drop some of the packets, the issue of "fairness" among the various clients 102(N) arises. Conventional techniques for determining which packets to drop from the queue are described in "Fair And Efficient Router Congestion Control" by Xioajie Gao, Kamal Jain and Leonard Schulman, presented at the 2004 ACM/SIAM Symposium On Discrete Algorithms in New Orleans, La., which is hereby incorporated herein by reference. Ideally, a router 118 should ensure that packets coming from different source clients 102 (N) are dropped fairly, that is, that no one client 102(N) is unduly penalized by the dropped packets. A router 118 also should ensure that each client 102(N) follows a prescribed protocol, e.g., multiplicative decrease of the number of packets sent per unit time in the event of congestion, and additive increase of the number of packets sent per unit time as congestion decreases. For example, when the router 118 determines that congestion is occurring, the source clients 102(N) should successively decrease traffic by a factor of two until the congestion issue is resolved.

In conventional wide area networks 110, one methodology for addressing congestion is for some clients to drop the overall data transmission throughput by a multiplicative factor. However, this is viewed by some source clients 102(N) as an incentive to "cheat" by increasing the rate at which that client originates data packets, in order to effectively "jump the queue", because those clients 102(N) who do follow the protocol will be dropping their transmission rates. If all, or many, of the clients 102(N) "cheat", the overall communications network 110 collapses.

The presently-described concept employs a new methodology: when one client 102(N) is identified as most egregiously violating the protocol, i.e., does not reduce the rate at which it is sourcing packets in response to network 110 congestion, that one client 102(N) is "frozen out"; that is, that far fewer of that client's packets are forwarded by the routers 118, or that client's throughput is drastically reduced. This provides strong incentive to avoid being identified as one of the "superspeeders" amongst the group of clients 102(N). This also avoids burdening the entire pool of clients 102(N) in response to "cheating" by a single or relatively few clients 102(N).

In practice, this methodology results in "punishment" that rotates between those clients 102(N) who do not follow the protocol. This occurs because the worst offender or offenders amongst the clients 102(N) will not be permitted to maintain communications and thus will "drop off the radar", leaving the next-worst offending clients 102(N) exposed.

When some client 102(N) does not follow the protocol, then it loses on throughput, i.e., the number of packets from that client 102(N) that are routed is harshly delimited. However, routers 118 have performance limits because they have finite computation and memory access bounds. The computation bound on the routers 118 is that a router 118 can perform only constant number of computation steps on each packet. The memory bound is a function of the fact that is not possible for the routers 118 to maintain a long history of the packets and thus of the clients 102(N). Attempting to keep a lengthy history for all clients 102, or even of chronic offenders, increases memory requirements to unrealistic levels and also increases memory access time. As a result, it is generally not practical to try to maintain detailed records of client history, so clients 102 who "misbehave" realize that they will not be held accountable based on prior bad acts.

This disclosure describes a congestion control protocol which is efficient and that also encourages the clients 102(N) to abide by agreed-upon rules for addressing congestion of routers 118 and which is based on short-term observations of client behavior. When some client 102(N) deviates significantly from the rules, it is "punished" by having throughput significantly reduced or stopped. The disclosed protocol is also quite simple to implement, in hardware as well as in software.

Process

Figure 2:
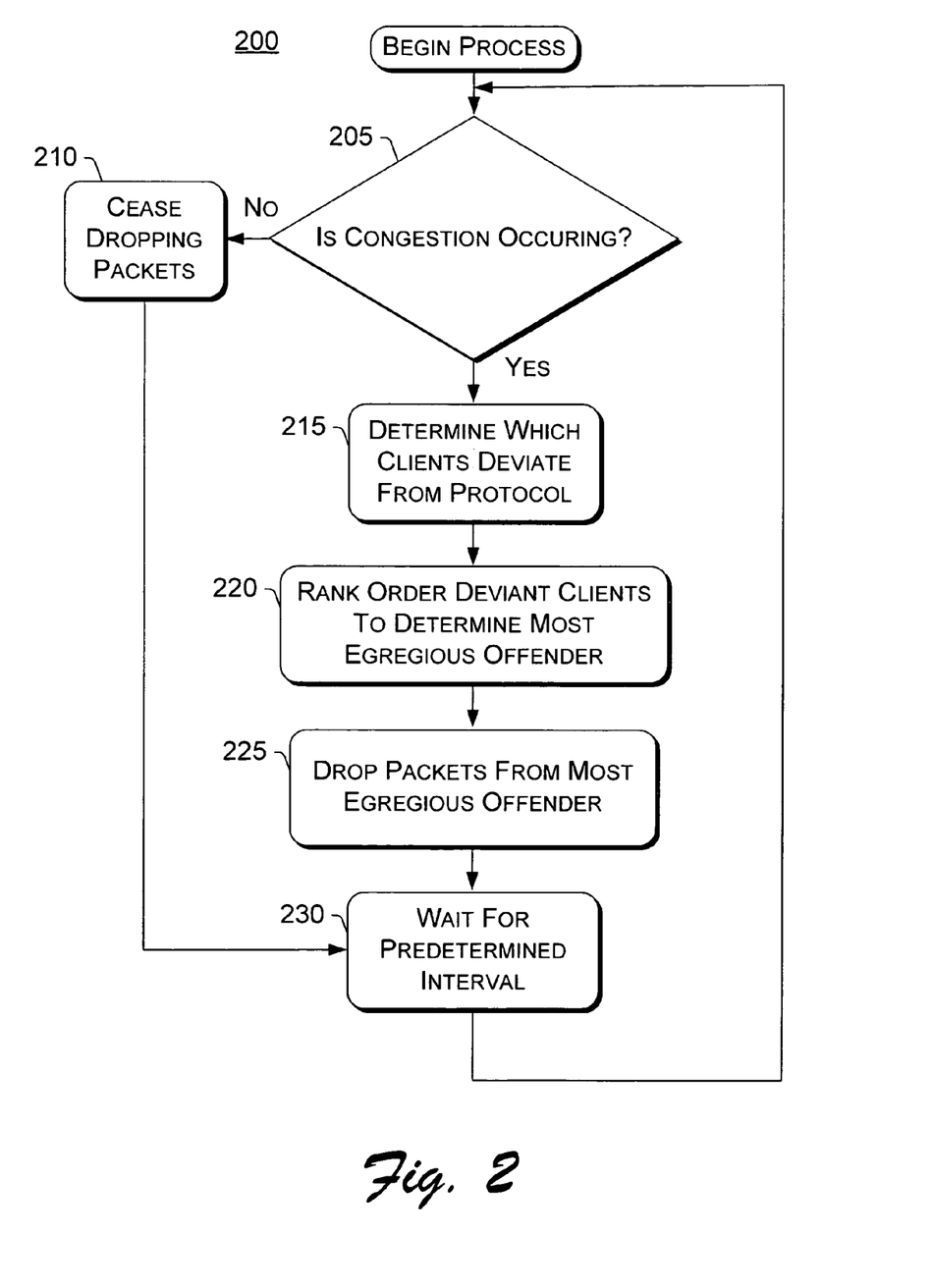
FIG. 2 is a flow chart of a process for managing router congestion in a distributed communications network having utility in the environment of FIG. 1.

FIG. 2 is a flow chart of a process 200 for managing router congestion in a distributed communications network 110 having utility in the environment 100 of FIG. 1. The process 200 is implemented in one or more of the routers 118 of FIG. 1, and has utility in wide area networks, such as the Internet, and local area networks or intranets. The process 200 begins in a query task 205.

In the query task 205, the process 200 determines when congestion is occurring in the distributed communications network 110. This is conventionally effectuated by monitoring messaging traffic originating from a plurality of clients 102(N).

When the query task 205 determines that that congestion is not occurring, the process 200 stops, or ceases dropping packets, in a block 210. Control then passes to block 230, discussed infra. When the query task 205 determines that congestion is occurring, the process 200 proceeds to a block 215.

In the block 215, the process 200 determines when one or more of the plurality of clients 102(N) deviates from an accepted congestion management protocol by accumulating a short history of data derived from the packet headers, such as identity of originating client and data volume associated therewith. For example, when one or more of the clients 102(N) attempts to increase a rate at which packets are being originated during a time of congestion, or fails to decrease a rate at which packets are being originated during a time of system congestion, a deviation is noted. The block 215 may, for example, keep track of packet transmission rates of clients for a relatively short period of time, such as over the past few minutes, and compare a present rate from a client 102 to one or more prior rates from that client 102.

In a block 220, the process 200 rank orders the deviants among those clients 102(N) of the plurality according to the egregiousness of their departure from the accepted protocol. For example, the block 220 may compare total volumes of packets sent from each client 102(N) during a short, recent interval. Alternatively, the block 220 may review short-term historical data for those clients 102(N) that account for a predetermined percentage of total packet traffic volume, or may review a given percentile group and above or a given decile and above. For example, the block 220 might review packet transmission rates for the top deciles (such as the top ten or twenty percent) of originators of packet traffic volume. The objective is to determine one or more worst, or most egregious, offenders amongst the plurality of clients 102(N).

In a block 225, the process 200 drops many, most or all packets from the worst offender(s) of the plurality of clients 102(N). In other words, the worst or most egregious offender (s) of the clients 102(N) find themselves simply "cut off", that is, not allowed to send packets at all, or may find a greatly reduced throughput. The routers 118 comprising the distributed communications network 110 do not forward packets originating from the identified offender at as high a rate as is afforded to those clients 102 who have failed to achieve such distinction.

In a block 230, the process 200 waits for a predetermined interval. Control then passes back to the query task 205, and the process 200 iterates. The process 200 is carried out in addition to other, conventional router functions, such as forwarding packets that are not dropped.

The process 200 may be implemented in several ways. One protocol for implementing the process 200 is described below. This protocol maintains several items of data: Q, representing a total number of packets in the queue; a hash table containing, for each flow i having packets in the queue, a record of $m_i$, a total number of packets presently in the queue from source i; and MAX, a pointer to the end of the source having a highest number of packets in the queue. In addition, there are several adjustable parameters controlling protocol behavior: F, describing size of the queue buffer; and "high" H and "low" L markers, collectively satisfying 0<L<H<F. A first portion of the protocol describes packet arrival events and a second portion of the protocol describes packet departure events.

In handling packet arrivals, first, when query task 205 determines that congestion is occurring, the process 200 identifies, in block 215, a source for packet i, e.g., from header information. Second, as part of block 220, the process 200 marks that packet DROP, if Q>H. Also as part of block 220, the process 200 marks that packet DROP, if H≧Q>L and i=MAX. Otherwise, the packet is marked SEND. Packets marked DROP are then dropped in block 225. Q and $m_i$ are incremented, e.g., by one; if $m_i$ was zero, a new record is created in the hash table.

In handling packet departures, first, the packet source i is identified. Second, Q and $m_i$ are decremented, e.g., by one; if $m_i$ is zero, the record is eliminated from the hash table. When the packet was stamped SEND, it is routed towards its destination; otherwise, it is dropped. When i=MAX but $m_i$ is no longer maximal, MAX is reassigned to a new maximal sender, as process 200 iterates, in block 220.

This protocol is in contrast to conventional protocols that implement "droptail" when buffer overflow is noted—in other words, those conventional protocols continue to serve packets that are already in the queue but do not accept new packets into the tail of the queue. In the protocol disclosed herein, packet drop decisions are made at the tail of the buffer, but the packets are not dropped there. Instead, a packet is appended to the tail of the buffer together with a stamp, either SEND or DROP, and then the packet is then later sent or dropped at the head of the queue, according to the stamp. Reasons for sending at least some information (e.g., header information) relative to packets to be dropped through the queue include effectuating two purposes: first, to buffer and thus time-average load through the queue, as in conventional approaches; and second, to provide a device for measuring recent traffic volumes from the various sources. This facilitates usage of the $m_i$ to estimate source rates, instead of computing exponential averages, as in some conventional approaches.

There are three time intervals associated with this protocol that are used to avoid buffer overflow without implementing droptail. These time intervals are $T_1$, the time to route a SEND packet at the head of the queue; $T_2$, the time to append a packet to the tail of the queue; and $T_3$, the time to move the head of the queue past a DROP packet. For proper operation of a queuing system, these times should satisfy the inequalities $T_1 > T_2 > T_3$. F and H are set so that $F/H > T_1/T_2$.

Another protocol differs from that just described only in how the process 200 marks packets to be dropped in block 220. In this protocol, instead of marking a packet DROP when $H \geq Q > L$ and i=MAX, the process 200 marks the packet DROP when $H \geq Q > L$ and $m_i \geq m_{MAX}(H-Q)/(H-L)$ in the block 220. This approach provides a sliding scale for dropping packets that achieves substantial advantages over both CHOKe and the first protocol in handling multiple unresponsive packet streams simultaneously.

Traffic Control Engine

Figure 3:
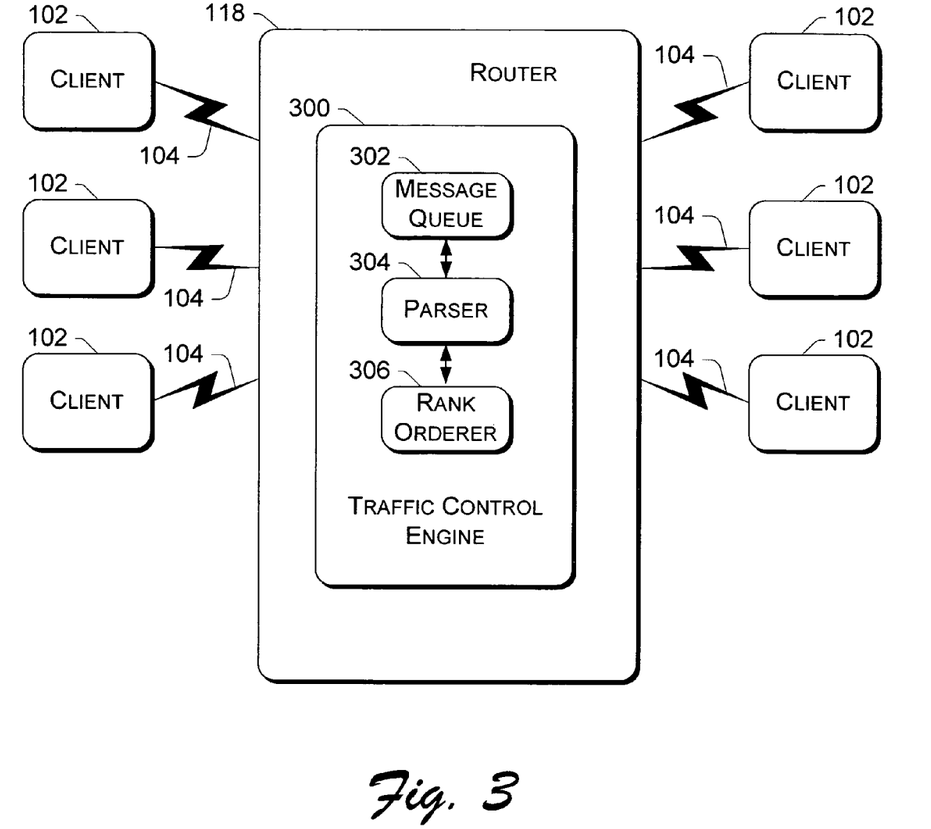
FIG. 3 is a block diagram of portions of a router, such as the router of FIG. 1, and includes a traffic control engine.

FIG. 3 is a block diagram of portions of a router, such as the router 118 of FIG. 1, and includes a traffic control engine 300. The traffic control engine 300 is useful in implementing the process 200 of FIG. 2 in the context of the environment 100 of FIG. 1. A plurality of clients 102 are coupled to the router 118 via interconnections 104 and are engaging in sending and/or receiving data packets via a plurality of interconnected routers 118, although only one router 118 is illustrated in FIG. 3.

The traffic control engine 300 includes a messaging queue 302, a parser 304 and a rank orderer 306. The messaging queue 302 comprises a memory and memory controller, and is configured to queue incoming packets. The parser 304 is configured to analyze each packet to determine a source client 102 and a destination client 102.

The rank orderer 306 is coupled to the messaging queue 302 and the parser 304 and is configured to determine (i) frequency of packets from each specific source client 102, (ii) a degree of congestion of the router 118, (iii) whether the frequency of any source client 102 is indicative of failure to abide by predetermined congestion management rules and (iv) a worst offender of the congestion management rules among the source clients 102. When the rank orderer 306 identifies a worst offender among the source clients 102, the messaging queue 302 is instructed to drop most or all packets from that source client 102.

By iteratively implementing the process 200 of FIG. 2, the traffic control engine 300 selectively punishes one or more clients 102 identified as: (i) contributing to the congestion and (ii) not abiding by the predetermined protocol. By dropping many or most of the packets from that client or clients 102, a relatively harsh penalty is imposed, but not at the expense of those clients 102 who are honoring the predetermined protocol.

Computer System

Figure 4:
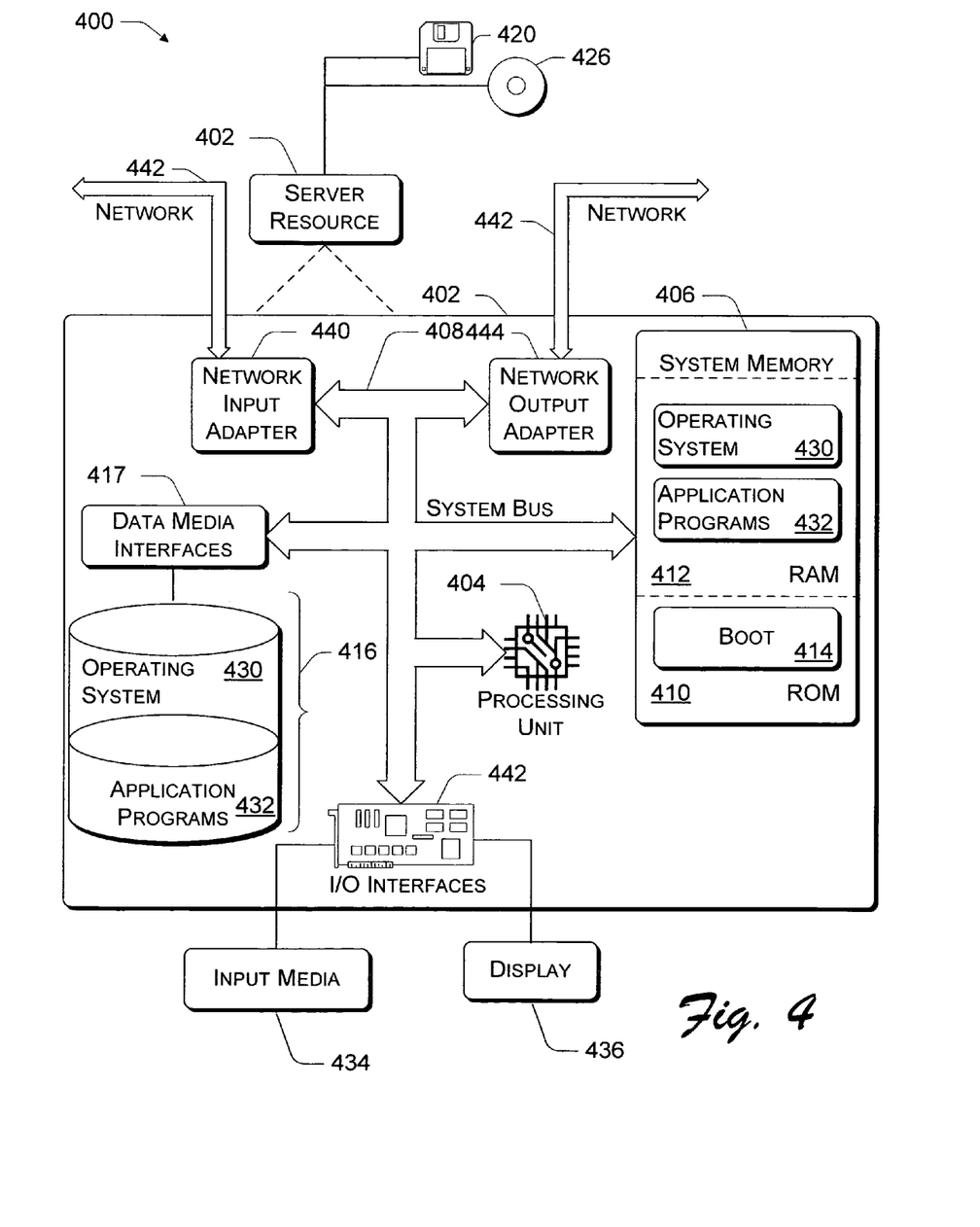
FIG. 4 is a block diagram of a router system applicable to the context of the environment of FIG. 1 and the disclosure, and which may be used to implement the process of FIG. 2.

FIG. 4 illustrates an example of a general router resource 400 applicable to the context of the environment 100 of FIG. 1 and the disclosure, and which may be used to implement the process 200 of FIG. 2. The illustrated operating environment is only one example of a suitable operating environment and is not intended to suggest any limitation as to the scope of use or functionality of the embodiments of this disclosure. Other well-known router systems, environments, and/or configurations may be suitable for implementation of the disclosure.

The present disclosure is provided in part in the general context of computer-executable instructions, such as program modules, executed by one or more computers, such as routers 118 or other devices. Generally, program modules include routines, programs, objects, components, data structures etc. that perform particular tasks or implement particular abstract data types. Typically the functionality of the program modules may be combined or distributed as desired in various embodiments.

The concepts disclosed herein may be implemented in hardware or a combination of hardware, software and/or firmware. For example, one or more application specific integrated circuits (ASICs) could be designed or programmed to embody the concepts disclosed herein.

FIG. 4 depicts a general example of a router resource 402 that can be used to implement the processes described herein. The router resource 402 is shown as an example of a computer in which various embodiments of these processes can be practiced. The router resource 402 is illustrated as only an example of a routing device that may be used with the disclosed concepts; other devices may alternatively used that include more components or alternatively fewer components than those illustrated in FIG. 4.

The router resource 402 includes one or more processors or processing units 404, a system memory 406, and a bus 408 that couples various system components including the system memory 406 to processor(s) 404. The bus 408 represents one or more of any of several types of bus structures, including a memory bus or memory controller and a processor or local bus using any of a variety of bus architectures. The system memory 406 includes nonvolatile read only memory (ROM) 410 and random access memory (RAM) 412, which may or may not be a volatile memory, and which comprise examples of articles of manufacture configured to embody computer-readable instructions for purpose of causing one or more processors 404 to execute functions in accordance with those instructions. A boot system 414 analogous to the basic input/output system (BIOS) used in personal computers, containing the basic routines that help to transfer information between elements within router resource 402, such as during start-up, is stored in ROM 410.

The router resource 402 further may include a hard disk drive 416 for reading from and writing to a hard disk, not shown, coupled to bus 408 via a data media interface 417

(e.g., a SCSI, ATA, or other type of interface); a magnetic disk drive (not shown) for reading from and writing to a removable magnetic disk 420 and an optical disk drive (not shown) for reading from and/or writing to a removable optical disk 426 such as a compact disc or CD, DVD, or other optical media. The hard disk drive 416, magnetic disk drive and/or optical disk drive are each coupled to the system bus 408 via conventional apparatus and techniques. The drives and their associated computer-readable media provide nonvolatile storage of computer-readable instructions, data structures, program modules and other data for the router resource 402.

Although the exemplary environment is described herein as employing a hard disk drive 416, a removable magnetic disk 420 and a removable optical disk 426, it will be appreciated by those skilled in the art that other types of computer-readable media which can store data that is accessible by a router 118 or server 402, such as magnetic cassettes, flash memory cards, random access memories (RAMs), read only memories (ROM), and the like, may also be used in the exemplary operating environment.

A small number of program modules may be stored on the hard disk drive 416, magnetic disk 420, optical disk 426, ROM 410, or RAM 412, including an operating system 430 and a limited number of application programs 432. Many routers employ conventional LINUX® or UNIX® operating systems. An operator or system administrator may enter commands and information into router resource 402 through input devices such as input media 438 (e.g., keyboard/keypad, tactile input or pointing device, joystick, touchscreen or touchpad, microphone, antenna etc.). Such input devices 438 are coupled to the processing unit 404 through an input/output interface 442 that is coupled to the system bus 408 (e.g., a serial port interface, a parallel port interface, a universal serial bus (USB) interface, an IEEE 1354 (Firewire) interface, etc.). A display or monitor 436 or other type of display device is also coupled to the system bus 408 to facilitate system administration tasks.

In a networked environment, such as that illustrated with computing environment 400, program modules depicted relative to the router resource 402, or portions thereof, may be stored in a remote memory storage device. By way of example, remote application programs may reside on a memory device of a remote computer (not illustrated) and may be delivered to the router resource 402, for example, via a modulated carrier wave. Network connections 442 represented in FIG. 4 may include a local area network (LAN) and/or a wide area network (WAN). Such networking environments are commonplace in modern computer networks, and in association with intranets and the Internet. Communications are effectuated via conventional apparatus such as modems, cable modems and the like. In the illustrated example of FIG. 4, one or more network input adapters 440 couples to one portion of the network 442, and one or more network output adapters 444 couple to the same or a different portion of the network 442. The network input adapter(s) 440 are configured to receive packets via the network 442, and to couple the received packets to the traffic control engine 300 of FIG. 3, which may comprise a portion of the router resource 402. The network output adapter(s) 444 are configured to transmit packets via the network 442 from the traffic control engine of FIG. 3, in conformance with the processes described with respect to FIG. 2.

The router resource 402 typically includes at least some form of computer-readable media. Computer-readable media can be any available media that can be accessed by the router resource 402. By way of example, and not limitation, computer-readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other media which can be used to store the desired information and which can be accessed by the router resource 402.

Communication media typically embodies computer readable instructions, data structures, program modules or other data embodied in a modulated data signal such as a carrier wave or other transport mechanism and includes any information delivery media. The term "modulated data signal" means a signal that has one or more of its characteristics set or changed in such a manner as to encode information in the signal.

By way of example, and not limitation, communication media includes wired media such as wired network or direct-wired connection, and wireless media such as acoustic, RF, infrared and other wireless media. Combinations of any of the above should also be included within the scope of computer readable media.

By providing appropriate computer-readable instructions to one or more router resources 402, for example as a portion of a limited complement of application software 432, these router resources 402 can be programmed to provide the process 200 of FIG. 2 and thus to form the traffic control engine 300 of FIG. 3.

CONCLUSION

Although the description above uses language that is specific to structural features, data organizational and/or storage schemata and/or methodological acts, it is to be understood that the recitation of the appended claims is not limited to the specific features or acts described. For example, it will be appreciated that the data handling concepts described herein are not limited to any specific data transmission protocol, rather, these data handling concepts may be implemented within a broad range of message/content exchange techniques. It will be appreciated that the specific features and acts are disclosed as exemplary forms of implementing these concepts.

What is claimed is:

1. A process for managing router congestion in a distributed communications system, comprising:
   receiving data packets from senders;
   tracking data packet transmission rates of the senders;
   implementing an accented congestion management protocol that expects each of the senders to decrease its respective data transmission rate if congestion occurs;
   detecting congestion or potential congestion;
   during the congestion or potential congestion, determining that one or more of the senders deviate from the accepted congestion management protocol by comparing, for each sender, a present data packet transmission rate to a prior tracked data transmission rate for the sender to determine whether the sender maintained or increased its rate of data packet transmission in violation of the accented congestion management protocol;

rank ordering the one or more of the senders according to egregiousness of their deviation from the accented congestion management protocol to generate a rank ordered list of one or more worst offenders;
identifying which of the received data packets are from the one or more worst offenders of the rank ordered list;
marking the identified data packets for dropping;
queuing in a queue, according to received order, the received data packets, including the identified data packets marked for dropping; and
transmitting the received data packets from a head of the queue except for at least some of those data packets marked for dropping which were received from a most egregious one of the one or more worst offenders according to the rank ordered list wherein a decision for not transmitting occurs based on the marking as each of the marked, identified data packets reaches the head of the queue.

2. A process as recited in claim 1, wherein the marking is performed only during periods of potential router congestion.

3. A process as recited in claim 1, wherein the identifying comprises:
tracking how many packets are in the queue from each sender.

4. A process as recited in claim 1, wherein the identifying comprises:
identifying which of the received packets are from the most egregious one of the one or more worst offenders according to the rank ordered list, and which of the received packets are from a second most egregious one of the one or more worst offenders according to the rank ordered list.

5. A process as recited in claim 1, wherein the marking is performed when the queue contains a number of packets that exceeds a predetermined threshold.

6. A process as recited in claim 1, wherein the marking is performed when the queue contains a number of packets that exceeds a first threshold, further comprising marking all packets when the number of packets contained by the queue exceeds a second threshold.

7. A process as recited in claim 1, wherein the transmitting further comprises sending the received packets from the queue except for those packets marked for dropping which were received from the most egregious one of the one or more worst offenders according to the rank ordered list.

8. A process as recited in claim 1, wherein the transmitting further comprises sending the received packets from the queue except for those packets marked for dropping which were received from the most egregious one of the one or more worst offenders according to the rank ordered list, and except for those packets marked for dropping which were received from a second most egregious one of the one or more worst offenders according to the rank ordered list.

9. A process for managing router congestion in a distributed communications system, comprising:
monitoring packets originating from senders wherein the monitoring comprises tracking data packet transmission rates of the senders;
implementing an accented congestion management protocol that expects each of the senders to decrease its respective data transmission rate if router congestion occurs;
detecting router congestion;
during the router congestion, determining that one or more of the senders deviate from the accepted congestion management protocol by comparing, for each sender, a present data packet transmission rate to a prior tracked data transmission rate for the sender to determine whether the sender maintained or increased its rate of data packet transmission in violation of the accented congestion management protocol;
rank ordering the senders according to egregiousness of their deviation from the accepted protocol to generate a rank ordered list of worst offenders;
identifying a worst offender based on the rank ordered list; and
dropping packets received from the worst offender, during the period of router congestion.

10. A process as recited in claim 9, further comprising:
after dropping the packets received from the worst offender, determining that the period of router congestion continues;
identifying a second worst offender based on the rank ordered list; and
dropping packets received from the second worst offender, during the period of router congestion.

* * * * *